(12) United States Patent
Asaka

(10) Patent No.: US 6,220,716 B1
(45) Date of Patent: Apr. 24, 2001

(54) POST ATTACHED TYPE FENDER MIRROR FOR AUTOMOTIVE VEHICLE

(76) Inventor: Hiroshi Asaka, 156-3 Akahatacho 3-chome, Mozu, Sakai-shi, Osaka (JP)

( * ) Notice: Subject to any disclaimer, the term of this patent is extended or adjusted under 35 U.S.C. 154(b) by 0 days.

(21) Appl. No.: 09/541,270

(22) Filed: Apr. 3, 2000

(30) Foreign Application Priority Data

Dec. 3, 1999 (JP) .................................................. 11-344153

(51) Int. Cl.[7] .................................................. G02B 7/182
(52) U.S. Cl. .......................... 359/871; 359/872; 359/873; 359/875
(58) Field of Search ..................................... 359/871, 872, 359/873, 875; 248/475.1, 476, 477, 478, 480, 483, 490

(56) References Cited

U.S. PATENT DOCUMENTS

| 5,327,294 | * | 7/1994 | Koske et al. | 359/872 |
| 5,513,048 | * | 4/1996 | Chen | 359/881 |

FOREIGN PATENT DOCUMENTS

| 004108882 | * | 9/1992 | (DE) | 359/871 |
| 52-69106 | | 1/1979 | (JP) . | |
| 62-54248 | | 9/1988 | (JP) . | |
| 5-23572 | | 11/1994 | (JP) . | |

* cited by examiner

Primary Examiner—Mohammad Sikder
(74) Attorney, Agent, or Firm—R. Neil Sudol; Henry D. Coleman; William J. Sapone

(57) ABSTRACT

The present invention provides a fender rearview mirror for an automotive vehicle which can be later attached in an easy and quick manner by a nonprofessional even in a vehicle using a door sideview mirror and satisfies a safety standard, such door sideview mirror being constituted by a mirror portion (1), a mounting seat portion (2) and a leg portion (3) therebetween, the mirror portion (1) forming a cylindrical base portion (8) which has an open lower portion on one side of a mirror cover (4) commonly serving as a hood; the mounting seat portion (2) can be gripped and fixed by a fastening bolt (13) with holding a frontward side edge portion (10) of a bonnet (9); the leg portion (3) rotatably engaging an upper portion with the cylindrical base portion (8) of the mirror portion (1) and forming a lower end surface in a cylindrical shape supported on the mounting seat portion (2); a tension coil spring (14) being provided so that an upper end portion (15) thereof may be engaged with an integral portion (17) of the cylindrical base portion (8) and a lower end portion (16) thereof being engaged with an integral portion (18) of the upper plate portion (11) of the mounting seat portion (2), whereby the mirror portion (1), the leg portion (3) and the mounting seat portion (2) being integrally formed by a spring force thereof.

24 Claims, 3 Drawing Sheets

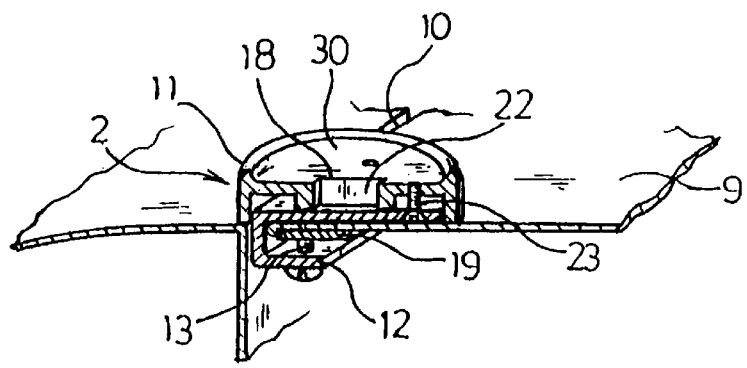
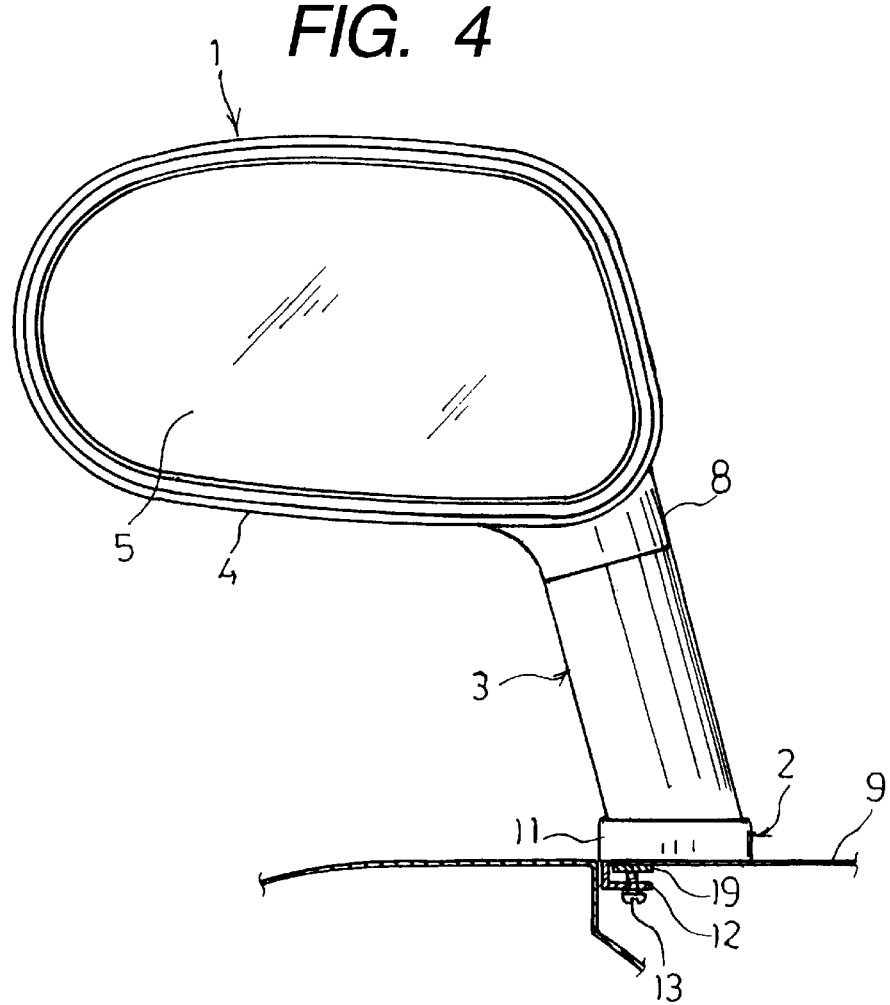

POST ATTACHED TYPE FENDER MIRROR FOR AUTOMOTIVE VEHICLE

BACKGROUND OF THE INVENTION

1. Field of the Invention

The present invention relates to a fender rearview mirror among door sideview mirrors for an automotive vehicle, and more particularly to a fender rearview mirror which can be mounted later to a portion close to a front side on a side portion of a bonnet.

2. Description of the Prior Art

The rearview mirrors for a vehicle of a type of an automotive vehicle include a fender rearview mirror and a door sideview mirror (a side mirror). The fender rearview mirror is provided so as to protrude over each of right and left fenders of the vehicle, and in Japan, the fender mirror was previously obligated to be mounted. On the contrary, in U.S.A and a part of Europe, the door mirror has been obligated to be mounted to doors on both sides of a driver's seat.

However, recently, in Japan, the door sideview mirror has been allowed and most of the vehicle use the door sideview mirror now. This is because the range of car design has been widened in accordance with a development of a technology and the automotive vehicle has been demanded mostly by young generation. Accordingly, it is considered that preference for a smart design by younger generations has caused increase mounting the door sideview mirror.

However, not that the door mirror is free from problems in view of driving the automotive vehicle. That is, in the case of the automotive vehicle equipped with the fender rearview mirror, the driver can only slightly moves his or her eyes rightward or leftward while carefully watching a forward direction, whereby the driver can easily and rapidly recognize a state of a backward direction owing to the fender rearview mirror. Accordingly, the driver can again drive the automotive vehicle carefully watching the forward direction by slightly moving his or her eyes forward.

On the contrary, in the case of the automotive vehicle equipped with door sideview mirrors, the driver can view the backward direction by the door mirror only by widely moving his or her heads rightward and leftward when carefully watching the forward direction. In particular, in order to confirm the backward left direction using the left door sideview mirror, a driver sitting on the driver's seat in a right-handle vehicle cannot view the backward direction unless he turns left his head facing the front and turns his eyes about 80 degrees.

Accordingly, in the vehicle equipped with door sideview mirror, in comparison with the vehicle equipped with the fender rearview mirrors, watching forward carefully is interrupted particularly when viewing the rearward direction, and the forward view disappears from his or her sight. Further, when returning to carefully watching the forward after confirming the rearward direction, it takes slightly longer than in the vehicle having the fender mirrors. Such are important particularly when the automotive vehicle is running at a high speed, and it is very dangerous that interruption in carefully watching the forward direction is caused even it is for a moment, so that there is a possibility of a rear-end collision and a contact accident.

Further, it has often been experienced while the automotive vehicle along a narrow road that a fender rearview mirror helps to show a width of the automotive vehicle so that the driver may drive the automotive vehicle while keeping the fender rearview mirrors not coming into contact with obstacles on both sides as if such fender rearview mirrors function like "cat's whiskers". However, the door sideview mirror can not serve such function thus it is hard to drive.

Further, since the door sideview mirrors are attached to the doors on both sides, the door sideview mirrors largely protrude on the both sides of a vehicle body, so that the door sideview mirrors may be brought into contact with pedestrian, or an automotive vehicle running in the opposite direction and the other objects when passing through the narrow road or the like, thereby injuring pedestrian and giving a damage to the objects. Further, there is a case that an angle of the mirror has come to be changed.

Some buyers of the automotive vehicle pay more attention to a safety rather than the design and refined design during the driving, and select the conventional vehicle having the fender rearview mirror in place of the automotive vehicle having the door sideview mirror. This is considered a proper selection particularly for a beginner and a person who is less confident in his capability of driving the automotive vehicle. Considering safe driving it is a matter of course that most of taxies generally use the fender rearview mirror type of the automotive vehicles in place of the door sideview mirror type of the automotive vehicles.

As mentioned above, although the automotive vehicle using the fender rearview mirror is required, most of the automotive vehicles recently use the door sideview mirror and the number of the automotive vehicles using the fender rearview mirror is small, and in some models of automotive vehicles, they all use the door sideview mirror.

SUMMARY OF THE INVENTION

Accordingly, it is desired to solve the problems mentioned above for a person who considers safe driving. The present invention is made to meet such by requirement and an object of the present invention is to provide a fender rearview mirror for an automotive vehicle which can be later attached in an easy and quick manner by a non professional who has automotive a vehicle using a door sideview mirror and who satisfies a safety standard.

In accordance with the present invention, there is provided a post attached type fender rearview mirror for an automotive vehicle comprising a mirror portion 1, a mounting seat portion 2 and a leg portion 3 therebetween, wherein the mirror portion 1 has a mirror body 5 provided within a mirror cover 4 commonly serving as a hood and is structured such that an angle of reflection can be adjusted by a spherical portion 6 and a recessed spherical portion 7 holding the spherical portion 6 in a surrounding manner and a cylindrical base portion 8 having an open lower portion is formed on one side of the mirror cover 5, the mounting seat portion 2 has an upper plate portion 11 which is mounted on an upper surface of a frontward side edge portion 10 of a bonnet 9 and a gripping lower plate portion 12 which is continuously connected to the upper plate portion 11, and is structured so as to be gripped and fixed from a lower portion with holding the frontward side edge portion 10 of the bonnet 9 therebetween by means of a fastening bolt 13, the leg portion 3 rotatably engages an upper portion with the cylindrical base portion 8 of the mirror portion 1 and supports a lower end surface so that it does not rotate on the mounting seat portion 2, and a tension coil spring 14 is provided in the leg portion 3 in such a manner that an upper end portion 15 is hooked and fixed to an integral portion 17 of the cylindrical base portion 8 of the mirror portion 1 and a lower end portion 16 is hooked and fixed to an integral portion 18 of the upper plate portion 11 of the seat portion 2, whereby the mirror portion 1, the leg portion 3 and the mounting seat portion 2 are integrally formed by a tensile force of the coil spring 14.

In the structure mentioned above, in the mirror portion 1, it is preferable that the mirror body 5 is made of a glass in the same manner as that of the conventionally used one, and the mirror cover 4 commonly serving as the hood for covering the portion except the mirror surface is made of a synthetic resin such as a polypropylene, an ABS or the like in view of manufacturing and cost, the material however is not limited to this. Further, the spherical portion 6 and the recessed spherical portion 7 which can hold the spherical portion 6 in a surrounding manner are provided between the inner surface of the mirror cover 4 and the rear portion of the mirror body 5.

Further, the cylindrical base portion 8 is formed on one side of the mirror cover 4 so that, for example, the cylindrical base portion 8 is formed on a right side in the case of the fender rearview mirror for the left side and the cylindrical base portion 8 is formed on a left side in the case of the fender rearview mirror for the right side, respectively. The cylindrical base portion 8 is protruded from the mirror cover 4 in an inclined manner toward an obliquely lower direction, that is, in a right lower direction in the case of the fender rearview mirror for the left side and in a left lower direction in the case of the fender rearview mirror for the right side.

The mounting seat portion 2 has the upper plate portion 11 which is mounted on the upper surface of the frontward side edge portion 10 of the bonnet 9 and the gripping lower plate portion 12 which is mounted to the back surface, and the lower plate portion 12 is structured such that the fastening bolt 13 can be engaged from the lower portion. It is preferable that the upper plate portion 11 is made, for example, by an aluminum die casting, and the gripping lower plate portion 12 is made, for example, of a stainless steel, however, the material being not limited to this.

It is preferable that an interval between the upper plate portion 11 and the gripping lower plate portion 12 is given so that it is greater than a thickness of the frontward side edge of the bonnet 9, for example, about 6 to 9 mm so as to be capable of gripping an interposed plate 19. Further, it is preferable that a female screw hole 20 which the fastening bolt 13 can be inserted to and engaged with from the lower portion is formed in the lower side plate portion 12.

The leg portion 3 is formed in a hollow cylindrical shape, and is structured such that the upper portion is formed in a circular shape in a horizontal cross section and can be rotatably engaged with the cylindrical base portion 8 of the mirror portion 1, a cylindrical portion capable of inserting the tension coil spring 14 is continuously provided below the upper portion, and the lower end surface is forked in the other shape than a circular shape, for example, an oval shape, an oblong circular shape or a rectangular shape so as not to accidentally rotate on the mounting seat portion 2. However, the lower end surface may be formed in a circular shape and have an uneven portion for preventing a rotation between the lower end surface and the upper plate portion 11 of the mounting seat portion 2. A material thereof is preferably a synthetic resin, for example, a polypropylene, an ABS or the like, the material however is not limited to these.

The lower end portion of the leg portion 3 is mounted on the upper plate portion 11 of the mounting seat portion 2 and hooked and fixed to the integral portion 18 thereof, and the mirror portion 1 is inclined so as to protrude in the left side direction in the case of the fender rearview mirror for the left side and protrude in the right side direction in the case of the fender rearview mirror for the rightside, respectively. Further, it is preferable that the lower end portion of the leg portion 3 is formed in an inclined shape at an angle, for example, between about 10 and 20 degrees with respect to the upper plate surface 11 so as to be inclined slightly rearward for avoiding a wind pressure during travelling.

Further, the tension coil spring 14 inserted into the leg portion 3 is structured such that the upper end portion 15 is hooked to the integral portion 17 of the cylindrical base portion 8 of the mirror cover 4 in the manner mentioned above, and the lower end portion 16 is, for example, formed in a hook shape and engaged with the integral portion 18 of the upper plate portion 11 of the mounting seat portion 2, thereby respectively fixed. In this case, the hook shape may include a shape obtained by bending or a shape obtained by bending it further upward.

Owing to the tensile force of the spring 14, the mirror portion 1 is integrally formed in the upper portion of the leg portion 3 in such a manner as to be capable of rotating around a center line so as not to be accidentally separated. The tension coil spring 14 is preferably made of a stainless steel.

In the structure mentioned above, the upper end portion 15 of the tension coil spring 14 may be directly engaged with the integral portion 17 of the cylindrical base portion 8, or may be engaged therewith via any other object. Further, the lower end portion 16 of the spring 14 is engaged with the integral portion 18 of the upper plate portion 11 of the mounting seat portion 2 in the same manner.

Next, a description will be given of how to mount the post attached type fender rearview mirror for the automotive vehicle in accordance with the present invention. The fender rearview mirror is in a state that the mounting seat portion 2, the leg portion 3 and the mirror portion 1 are integrally assembled by the tension coil spring 14 which is provided there within.

Then, the mounting seat portion 2 of the fender rearview mirror is fitted to the left end edge close to the front portion in the case of the fender rearview mirror for the left side and to the right end edge close to the front portion in the case of the fender rearview mirror for the right side in such a manner as to be gripped between the upper plate portion 11 and the gripping lower plate portion 12, by opening the bonnet 9 of the automotive vehicle.

In this state, the fixing bolt 13 is inserted to and engaged with the gripping lower plate portion 12 from the lower side and the front end portion thereof is fastened to a back surface of the bonnet 9. At this time, it is preferable that the metal interposed plate 19 is provided so as to be brought into contact with the back surface of the bonnet 9 (for example, refer to FIG. 3).

Then, since the mounting seat portion 2 is gripped and fixed to the side end edge of the bonnet 9, the upper plate portion 11 of the mounting seat portion is mounted on the upper surface of the left side close to the front portion or the right side close to the front portion in the bonnet 9 by closing the bonnet 9, so that the fender mirror is later mounted in such a manner that the leg portion 3 protrudes upward in the upper portion thereof and the mirror portion 1 protrudes to the left or right side portions over the leg portion 3 (for example, refer to FIGS. 1 and 4).

In the case that the rear side portion can not be properly viewed by the fender rearview mirror due to the type of the automotive vehicle, a seated posture of the driver and the like, the fender rearview mirror may be finely adjusted by tilting the mirror body 5 within the mirror cover 4 in a lateral direction and a vertical direction between the spherical portion 6 and the recessed spherical portion 7 holding the spherical portion in a surrounding manner, and maybe rotated and adjusted in a lateral direction by utilizing the the cylindrical base portion 8 of the mirror portion 1 which is rotatable in the upper portion of the leg portion 3. Then, in the fender mirror, the post attaching operation of the automotive vehicle to the bonnet is completed.

The tension coil spring 14 of the fender mirror is provided within the leg portion 3, and integrally assembles the mirror portion 1 and the mounting seat portion 2. This is different from the fender rearview mirror of the conventional type of an automotive vehicle having a fender rearview mirror in that a hole is pieced on the fender and the fender rearview mirror is munted by the coil spring inserted through the hole and is engaged in the inner side of the fender rearview mirror. Accordingly, in this fender rearview mirror, it is not necessary to pierce on the bonnet or the fender at a time of mounting the fender rearview mirror, and a nonprofessional having no special technique can easily and quickly mount the fender rearview mirror later.

Next, with respect to a safety against collision of the post attachable type fender rearview mirror, in the case that some object is collided with the portion close to the side portion of the mirror portion 1 and the force is applied thereto, since the cylindrical base portion 8 of the mirror portion 1 is rotatably engaged with the upper portion of the leg portion 3, the mirror portion 1 can rotate around the center line thereof in the portion close to the upper portion of the leg portion 3, thereby absorbing an impact force, so that the fender rearview mirror is not easily broken.

Further, in the case that some object is collided with the portion close to the cylindrical base portion 8 of the mirror portion 1 and the large force is applied, since the mirror portion 1 and the leg portion 3 are integrally assembled with the mounting seat portion 2 by the tension coil spring 14 which is inserted into the leg portion 3 in place of an adhesion, the coil spring 14 is extended when the impact force is applied to the portion close to the cylindrical base portion 8 of the mirror portion 1. Accordingly, the leg portion 3 temporarily comes down on the mounting seat portion 2, thereby absorbing the impact force, so that the fender rearview mirror is prevented from being broken.

In this case, the leg portion 3 which temporarily comes down is automatically returned by a spring force of the tension coil spring 14 to an original state, however, when the leg portion is caught by some object and is not automatically returned, it can be returned to a standing state on the mounting seat portion 2 owing to the spring force by slightly lifting it up by hand.

A strength test is conducted to the post attached type fender rearview mirror for the automotive vehicle in accordance with the present invention mentioned above. This test is "TRIAS29-1973" that uses a testing machine of "a pendulum mirror impact testing machine (6.8 Kg of a weight of a bob, 16 mm of a diameter of the bob, 1 m of a distance between a center of rotation of the pendulum and the bob)", a direction of impact is set to "a backward direction in parallel to a center line of the automotive vehicle" and the impact is applied by dropping the pendulum from a position at which an angle of the pendulum with respect to the vertical line becomes 60 degrees when the pendulum becomes at the vertical position.

In accordance with the result of the test, in both of the right and left fender rearview mirrors, "no breakage is recognized", and it was apparent that "a metal pedestal (the mounting seat portion 2) and a spring suspended resin body (the leg portion 3) came out of position and rotates and a rotating portion in a center of the body (an axially supporting short cylindrical portion 21 in the upper portion of the leg portion 3 and the cylindrical base portion 8 of the mirror portion 1) rotated, whereby the breakage could be prevented.

BRIEF DESCRIPTION OF THE DRAWINGS

FIG. 3 is a partly notched perspective view of amounting seat portion of the fender rearview mirror shown in FIG. 1; and FIG. 4 is a partly notched front elevational view of a left fender rearview mirror as viewed frame a driver's seat.

DESCRIPTION OF THE PREFERRED EMBODIMENT

FIGS. 1 to 4 show an embodiment of a post attached type fender rearview mirror in accordance with the present invention. The mirror portion 1, the mounting seat portion 2 and the leg portion 3 therebetween are integrally assembled, and here a fender rearview mirror attached to a left fender as seen from the driver's seat is shown.

Figure 1:
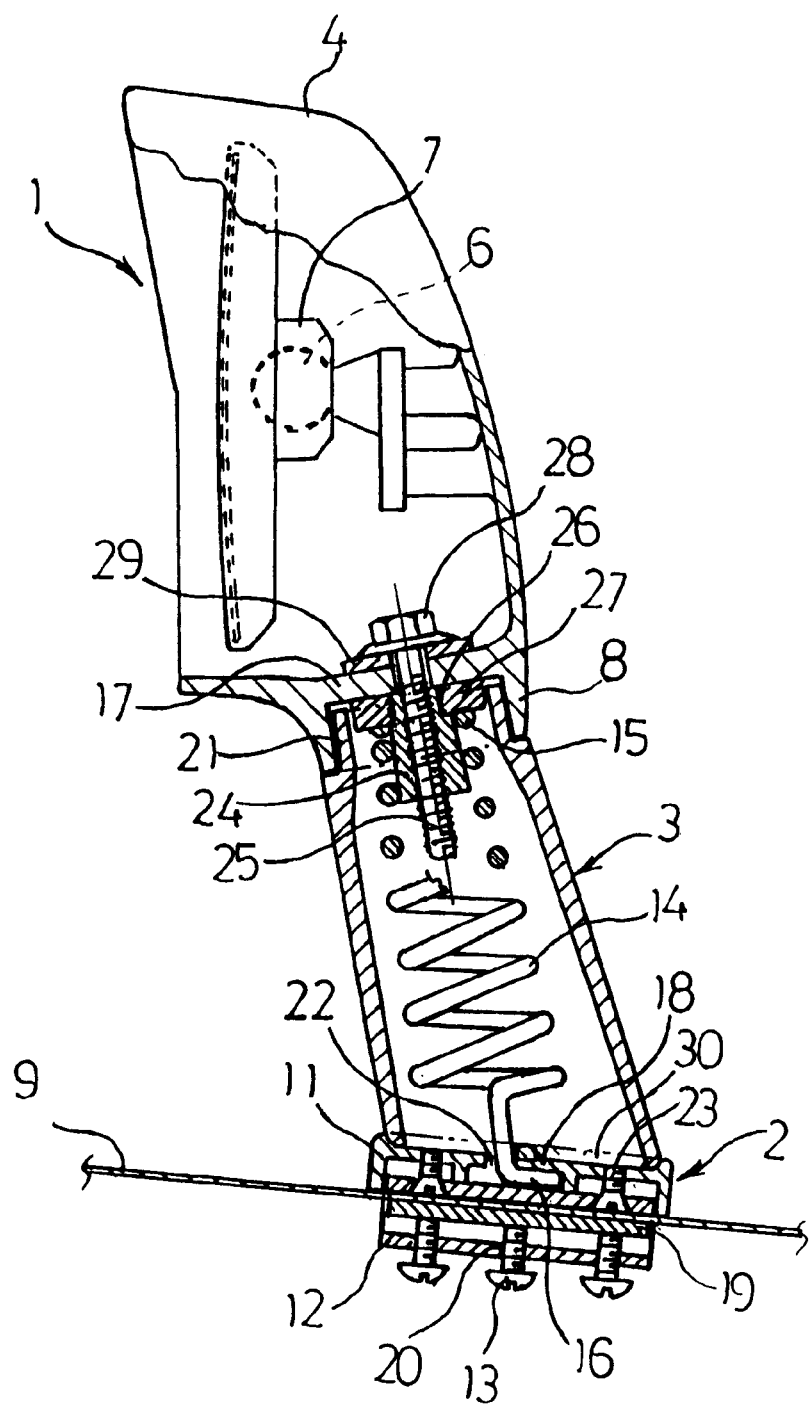
FIG. 1 is a partly notched side elevational view which shows an embodiment of a post attached type fender rearview mirror for an automotive vehicle in accordance with the present invention.

The mirror portion 1 is provided with the mirror body 5 within the mirror cover 4 also serving as the hood, as shown in FIGS. 1 and 4. In this structure, the mirror body 5 is made of a glass and the mirror cover 4 is made of an ABS resin in this case. Further, the recessed spherical portion 7 is provided at the rear portion of the mirror body 5, the spherical portion 6 is provided in a protruding manner at the back of the inner portion of the mirror base portion 4, and the angle of reflection of the mirror body 5 can be manually adjusted by rotatably holding the spherical portion 6 at the recessed spherical portion 7.

The cylindrical base portion 8 having a circular shape in a horizontal cross section is provide downward in one side of the mirror cover 4 mentioned above. In this case, since the fender rearview mirror is the left fender rearview mirror as seen from the driver's seat, the cylindrical base portion 8 is formed in such a manner as to protrude in an obliquely right lower direction on the right side of the mirror cover 4 so that the mirror cover 4 slightly protrudes in the left side direction. Further, an inner flange portion having a through hole for inserting the bolt is formed in the upper portion of the inner portion of the cylindrical base portion 8 as the integral portion 17 of the cylindrical base portion 8 (refer to FIG. 1).

Figure 2:
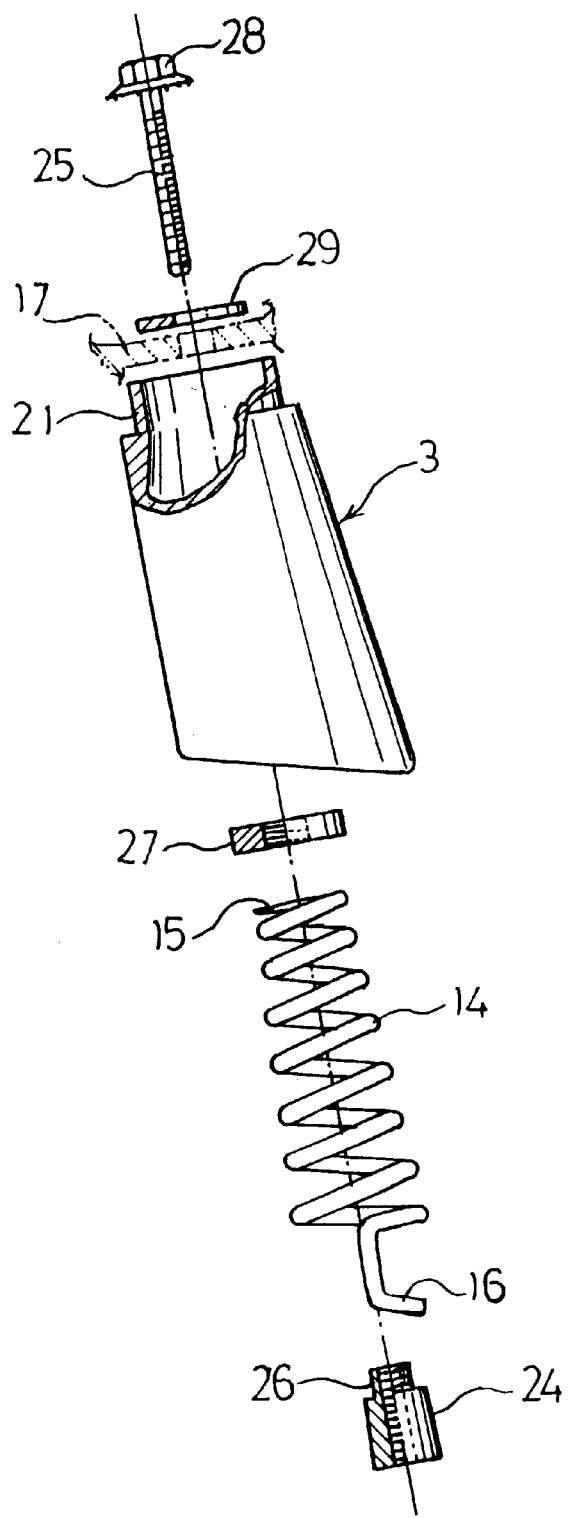
FIG. 2 is an exploded view of a leg portion of the fender rearview mirror shown in FIG. 1.

The leg portion 3 mentioned above is formed in a hollow cylindrical shape as shown in FIGS. 1 and 2, and has the short cylindrical portion 21 having a circular shape in a horizontal cross section and rotatably engaging with the inner portion of the cylindrical base portion 8 of the mirror portion 1 in the upper portion, and the lower portion thereof is formed in a cylindrical shape which can insert the tension coil spring 14 as mentioned below. The lower end surface of the leg portion 3 is structured such that the leg portion 3 is inclined with respect to the upper plate portion 11 of the mounting seat portion 2, and it is formed in an oblong circular shape here so as to prevent an accidental rotation on the mounting seat portion 2. The leg portion 3 is made of a polypropylene in this case.

Further, the leg portion 3 is not formed on the mounting seat portion 2 in a perpendicularly standing manner, but the center line thereof is inclined at about 15 degrees in a left side direction as seen from the driver's seat so that the mirror portion 1 easily protrudes in the left side direction, and the lower end surface of the leg portion 3 is formed in a obliquely cut shape so as to avoid a wind pressure at a time of travelling and tilts rearward at about 15 degrees. A height of the leg portion 3 in a vertical direction is set to about 85 mm in this case.

The mounting seat portion 2 mentioned above is structured such that the per plate portion 11 mounted on the upper surface of the bonnet 9 is formed by an aluminum die casting in this case as shown in FIGS. 1 and 3, and the lower surface thereof is formed in an inclined shape in accordance with an incline of the bonnet 9 so that the upper surface is formed in a horizontal shape. Further, a shallow recess portion 30 having an oblong circular shape is formed on the upper surface of the upper plate portion 11 so that the oblong circular lower end surface of the leg portion 3 can engage, and a horizontally oblong hole 22 is formed in the center portion thereof so as to engage and hook a hook-shaped lower end portion 16 of the tension coil spring 14.

Further, the gripping lower plate portion 12 formed in a C shape in a cross section between the side portion and the lower side is mounted to a back surface of the mounting seat portion 2, is made of a stainless steel having a thickness of about 2 mm in this case, and is adhered to the lower surface of the upper plate portion 11 by a screw 23 with setting an interval from the upper to lower portions of the C-shaped cross section to be greater than the thickness of the side edge portion 10 of the bonnet 9, in this case about 8 mm.

A female screw hole 20 is provided in the gripping lower plate portion 12, the fixing bolt 13 is inserted to and engaged with the female screw hole 20 by holding the side edge portion 10 of the bonnet 9 therebetween, whereby fastening and fixing can be performed. At this time, the structure is made such that the metal interposed plate 19 is interposed in the upper end of the fixing bolt 12.

The tension coil spring 14 provided within the leg portion 3 is made of a stainless steel having a wire diameter of about 4 mm in this case, as shown in FIGS. 1 and 2, and uses a conical coil spring having a free length (a total length) of about 65 mm, an outside diameter of the coil close to the lower portion of 16 mm and an outside diameter of the coil close to the upper portion of 24 mm and having a vertically bent hook-shaped lower end portion 16 in the lower portion. The hook-shaped lower end portion 16 is slightly protruded downward from the lower end portion of the leg portion 3.

The tension coil spring 14 is mounted to the mirror portion 1 as shown in FIG. 1, in such a manner as to interpose a truncated conical shaped nut 24 in the inner upper portion of the tension coil spring 14. A fastening bolt 25 inserted for fastening so that its head portion is engaged with inner flange portion corresponding to the integral portion 17 of the mirror portion 1 is threadedly engaged fra above with the nut 24, thereby the upper end portion 15 of the spring portion 14 is pulled upward and fixed.

Further, the tension coil spring 14 is mounted to the mounting seat portion 2 as shown in FIGS. 1 and 3, in such a manner as to fit the hook-shaped lower end portion 16 of the lower portion of the tension coil spring 14 to the horizontally oblong hole 22 of the integral portion 18 formed in the upper plate portion 11 of the mounting seat portion 2 so as to be rotated at 90 degrees for engagement, and engaged with a groove (not shown) on the lower surface of the upper plate portion 11, whereby an accidental rotation is prevented.

Further, since the hook-shaped lower end portion 16 engaged in the manner mentioned above is pressed and fixed by the upper side plate of the gripping lower plate portion 12 having a C-shaped cross section from the lower side, it does not come out from the mounting seat portion 2. Accordingly, the mounting seat portion 2 and the leg portion 3 are firmly integrated owing to a strong spring force when they are once engaged and fixed by the coil spring 14 in the manner mentioned above, so that they are not separated.

In this case, the truncated conical shaped nut 24 has a male screw portion 26 in the upper portion, and a holding plate 27 with a female screw hole is engaged with a center of the male screw portion 26 so as to protrude upward from the upper end of the tension coil spring 14. Further, an uneven seat surface formed in a chrysanthemu-shaped metal fixture is formed in a lower side of a head portion 28 of the fastening bolt 24 so as to prevent rotation between the head portion 28 and a washer 29 in the inner flange portion corresponding to the integral portion 17 of the mirror portion 1 (refer to FIG. 2).

In order to mount the fender rearview mirror to the bonnet 9 of the automotive vehicle, as shown in FIGS. 1 and 3, it is sufficient to fix the mounting seat portion 2 to the side edge portion 10 of the bonnet 9 by means of the fixing bolt 13. When closing the bonnet 9, the fender rearview mirror is mounted in such a manner that the leg portion 3 protrudes upward on the upper portion of the upper plate portion 11 in the mounting seat portion 2 and the mirror portion 1 protrudes sideward toward the upper portion of the leg portion 3 (refer to FIG. 4).

The above description is given of the fender rearview mirror provided on the left fender as seen from the driver's seat, however, the fender rearview mirror is mounted on the right fender in a symmetrical manner with respect to a lateral direction. Accordingly, the post attached type fender rearview mirror is placed on the side edge portion 10 close to the front portion of the bonnet 9 for the automotive vehicle, so that a person who does not have a special technique can easily and quickly mount the fender rearview mirror.

EFFECT OF THE INVENTION

As mentioned above, the post attached type fender rearview mirror for the automotive vehicle in accordance with the present invention can be easily attached even by the nonprofessional having no special technique. Although comparatively inexpensive, such fender rearview mirror can satisfy a safety standard and improve safety at a time of driving.

That is, most of the rearview mirrors for the automotive vehicle in recent days are the door mirrors (the sideview mirrors). The door mirror is preferable in view of the design, however, has the problems that it is necessary to turn his or her eyes for viewing the rear side direction while driving and the door mirror is likely to contact with the passenger while travelling on the narrow road since it protrudes much on the side portion of the vehicle body.

On the contrary, the post attached type fender rearview mirror for the automotive vehicle in accordance with the present invention can be manufactured at lower cost since the structure is comparatively simple. Further, the fender rearview mirror can be mounted by fitting the gripping lower plate portion having a C-shaped cross section in the mounting seat portion to the side end edge of the bonnet of the automotive vehicle and inserting and engaging the mounting bolt fron the lower portion of the gripping lower plate portion. By only these operations, the fender rearview mirror can be later attached to the side end edge of the bonnet, and the person having no special technique can easily and quickly modify the automotive vehicle to the automotive vehicle with the fender rearview mirror.

Further, the post attached type fender rearview mirror for the automotive vehicle in accordance with the present invention satisfies the safety standard under the collision. That is, since the cylindrical base portion of the mirror portion can be rotated to the upper portion of the leg portion, the mirror portion can rotate around the center line in the portion close to the upper portion of the leg portion so as to absorb the impact force in the case that some object collides with the portion close to the side portion of the mirror portion, thereby preventing the mirror portion from breakage.

Further, in the post attached type fender rearview mirror for the automotive vehicle, the mounting seat portion and the leg portion disposed above the mounting seat portion are integrally assembled by being engaged by the tension coil spring inserted into the leg portion in place of the adhesion. Accordingly, even when some object collides with the portion close to the cylindrical base portion of the fender rearview mirror, the coil spring extends owing to the application of the impact force and the leg portion temporarily comes down on the seat portion, so that it is possible to absorb the impact force so as to prevent breaking, and the fender rearview mirror can be automtically returned to the original standing position on the seat portion owing to the spring force.

What is claimed is:

1. A post attached type fender rear view mirror for an automotive vehicle comprising a mirror portion (1), a mounting seat portion (2) and a leg portion (3) therebetween,
   wherein the mirror portion (1) has a mirror body (5) provided within a mirror cover (4) commonly serving as a hood and is structured such that an angle of reflection can be adjusted by a spherical portion (6) and a recessed spherical portion (7) holding the spherical portion (6) in a surrounding manner and a cylindrical base portion (8) having an open lower portion is formed on one side of the mirror cover (5),
   the mounting seat portion (2) has an upper plate portion which is mounted on an upper surface of a frontward side edge portion (10) of a bonnet (9) and a gripping lower plate portion (12) is continuously connected to the upper plate portion (11), and is structured so as to be gripped and fixed from a lower portion with holding the frontward side edge portion (10) of the bonnet (9) therebetween by means of a fastening bolt (13),
   the leg portion (3) rotatably engages an upper portion with the cylindrical base portion (8) of said mirror portion (1) supporting a lower end surface so as not to rotate on said mounting seat portion (2), and
   a tension coil spring (14) is provided so that an upper end portion (15) is hooked and fixed to an integral portion (17) of the cylindrical base portion (8) of said mirror portion (1) and a lower end portion (16) is hooked and fixed to an integral portion (18) of the upper plate portion (11) of said seat portion (2), whereby the mirror portion (1), the leg portion (3) and the mounting seat portion (2) are integrally formed by a tensile force of said coil spring (14).

2. A post attached type fender rearview mirror for an automotive vehicle as claimed in claim 1, wherein in the mirror portion (1), the mirror body (5) is made of glass and the mirror cover (4) commonly serving as the hood for covering the portion except the mirror surface is made of a synthetic resin taken from the group consisting of a polypropylene and an ABS.

3. A post attached type fender rearview mirror for an automotive vehicle as claimed in claim 1, wherein the spherical portion (6) and the recessed spherical portion (7) which can hold the spherical portion (6) in a surrounding manner are provided between the inner surface of the mirror cover (4) and the rear portion of the mirror body (5).

4. A post attached type fender rearview mirror for an automotive vehicle as claimed in claim 1, wherein the cylindrical base portion (8) is formed in one side of said mirror cover (4) so that the cylindrical base portion (8) is formed in a right side in the case of the fender rearview mirror for the left side and the cylindrical base portion (8) is formed in a left side in the case of the fender rearview mirror for the right side, respectively.

5. A post attached type fender rearview mirror for an automotive vehicle as claimed in claim 1, wherein said cylindrical base portion (8) is protruded from the mirror cover (4) in an inclined manner toward an obliquely lower direction, that is, toward a right lower direction in the case of the fender mirror for the left side and toward a left lower direction in the case of the fender rearview mirror for the right side.

6. A post attached type fender rearview mirror for an automotive vehicle as claimed in claim 1, wherein the mounting seat portion (2) has the upper plate portion (11) which is mounted on the upper surface of the frontward side edge portion (10) of the bonnet (9) and the gripping lower plate portion (12) which is mounted to the back surface, and the lower plate portion (12) is structured such that the fastening bolt (13) can be engaged from the lower portion.

7. A post attached type fender rearview mirror for an automotive vehicle as claimed in claim 1, wherein said upper plate portion (11) is made by an alumina die casting, and the gripping lower plate portion (12) is made of a stainless steel.

8. A post attached type fender rearview mirror for an automotive vehicle as claimed in claim 1, wherein an interval between the upper plate portion (11) and the gripping lower plate portion (12) is set to an interval greater than a thickness of the frontward side edge of the bonnet (9) so as to be capable of gripping an interposed plate (19).

9. A post attached type fender rearview mirror for an automotive vehicle as claimed in claim 8, wherein said interval is about 6 to 9 mm.

10. A post attached type fender rearview mirror for an automotive vehicle as claimed in claim 1, wherein a female screw hole (20) which the fastening bolt (13) can be inserted to and engaged with from the lower portion is formed in the lower side plate portion (12).

11. A post attached type fender rearview mirror for an automotive vehicle as claimed in claim 1, wherein the leg portion (3) is formed in a hollow cylindrical shape, and is structured such that the upper portion is formed in a circular shape in a horizontal cross section and can be rotatably engaged with the cylindrical base portion (8) of said mirror portion (1), a cylindrical portion capable of inserting the tension coil spring (14) is continuously provided below the upper portion, and the lower end surface is formed in the other shape than a circular shape so as not to accidentally rotate on the mounting seat portion (2).

12. A post attached type fender rearview mirror for an automotive vehicle as claimed in claim 11, wherein said shape of the lower end surface is one selected from the group consisting of a circular shape, an oblong circular shape and a rectangular shape.

13. A post attached type fender rearview mirror for an automotive vehicle as claimed in claim 1, wherein the lower end surface is formed in a circular shape and have an uneven portion for preventing a rotation formed between the lower end surface and the upper plate portion (11) of the mounting seat portion (2).

14. A post attached type fender rearview mirror for an automotive vehicle as claimed in claim 1, wherein a material of the leg portion is set to a synthetic resin.

15. A post attached type fender rearview mirror for an automotive vehicle as claimed in claim 14, wherein the material of the leg portion is taken from the group consisting of a polypropylene and an ABS.

16. A post attached type fender rearview mirror for an automotive vehicle as claimed in claim 1, wherein the lower end portion of said leg portion (3) is mounted on the upper plate portion (11) of said mounting seat portion (2) and hooked and fixed to the integral portion (18) thereof, and the mirror portion (1) is inclined so as to protrude the left side direction in the case of the fender rearview mirror for the left side and protrude the right side direction in the case of the fender rearview mirror for the right side, respectively.

17. A post attached type fender rearview mirror for an automotive vehicle as claimed in claim 16, wherein the lower end portion of the leg portion (3) is formed in an inclined shape at an angle with respect to the upper plate surface (11) so as to be inclined a little rearward for avoiding a wind pressure at a time of travelling.

18. A post attached type fender rearview mirror for an automotive vehicle as claimed in claim 17, wherein said angle of the lower end portion of the leg portion is between about 10 and 20 degrees.

19. A post attached type fender rearview mirror for an automotive vehicle as claimed in claim 1, wherein the tension coil spring (14) inserted into the leg portion (3) is structured such that the upper end portion (15) is hooked to the integral portion (17) of the cylindrical base portion (8) of said mirror cover (4) in the manner mentioned above, and the lower end portion (16) is formed in a hook shape and engaged with the integral portion (18) of the upper plate portion (11) of said mounting seat portion (2), thereby respectively being fixed.

20. A post attached type fender rearview mirror for an automotive vehicle as claimed in claim 1, wherein the tension coil spring (14) is made of a stainless steel.

21. A post attached type fender rearview mirror for an automotive vehicle as claimed in claim 1, wherein the upper end portion (15) of said tension coil spring (14) is directly engaged with the integral portion (17) of the cylindrical base portion (8).

22. A post attached type fender rearview mirror for an automotive vehicle as claimed in claim 1, wherein the upper end portion (15) of said tension coil spring (14) is engaged with the integral portion (17) of the cylindrical base portion (8).

23. A post attached type fender rearview mirror for an automotive vehicle as claimed in claim 1, wherein the lower end portion (16) of said spring (14) is directly engaged with the integral portion (18) of the upper plate portion (11) of the mounting seat portion (2).

24. A post attached type fender rearview mirror for an automotive vehicle as claimed in claim 1, wherein the lower end portion (16) of said spring (14) is engaged with the integral portion (18) of the upper plate portion. (11) of the mounting seat portion (2).

\* \* \* \* \*